United States Patent [19]

Kroha et al.

[11] Patent Number: 5,575,511
[45] Date of Patent: Nov. 19, 1996

[54] FUEL FILTER COUPLING BRACKET

[75] Inventors: John L. Kroha, Grosse Pointe; Daryl S. Beesley, South Lyon, both of Mich.

[73] Assignee: Flexon, Inc., Ferndale, Mich.

[21] Appl. No.: 418,759

[22] Filed: Apr. 7, 1995

[51] Int. Cl.$^6$ .................................. F16L 3/00; F16L 35/00
[52] U.S. Cl. ............................ 285/61; 285/330; 285/921; 411/918
[58] Field of Search ............................. 285/178, 38, 330, 285/391, 921; 411/525, 526, 527, 918; 210/232

[56] References Cited

U.S. PATENT DOCUMENTS

| | | |
|---|---|---|
| 392,032 | 10/1888 | Jacobson . |
| 409,127 | 8/1889 | Taggart . |
| 1,140,720 | 5/1915 | Simons . |
| 1,884,869 | 10/1932 | Replogle . |
| 2,109,344 | 2/1938 | Selger ..................................... 285/330 |
| 2,589,136 | 3/1952 | Ralston ..................................... 210/24 |
| 3,064,998 | 11/1962 | Syverson ............................. 285/330 X |
| 3,102,508 | 9/1963 | Smith, Jr. .............................. 411/918 X |
| 3,909,221 | 9/1975 | Bengtsson ................................. 55/314 |
| 4,040,964 | 8/1977 | Hegyi ...................................... 210/238 |
| 4,052,307 | 10/1977 | Humbert, Jr. ........................... 210/130 |
| 4,271,020 | 6/1981 | Van Meter .......................... 210/133 Q |
| 4,452,695 | 6/1984 | Schmidt ................................... 210/168 |
| 4,543,007 | 9/1985 | Quiogue ..................................... 403/97 |
| 4,655,482 | 4/1987 | Myers et al. ......................... 285/305 X |
| 4,861,474 | 8/1989 | Kroha ..................................... 210/232 |
| 4,933,079 | 6/1990 | Kroha ..................................... 210/232 |
| 5,045,192 | 9/1991 | Terhune ................................... 210/232 |
| 5,256,284 | 10/1993 | Lee ........................................ 210/232 |
| 5,321,205 | 6/1994 | Bawa et al. .............................. 285/330 |

Primary Examiner—Randolph A. Reese
Assistant Examiner—Heather Chun Shackelford
Attorney, Agent, or Firm—Young & Basile, P.C.

[57] ABSTRACT

A fluid coupling bracket adaptable for snap-on engagement with a coupling base. The fluid coupling bracket has tabs that engage with an annular groove of the fluid coupling base, and a plurality of teeth that set against radially extending ledges protruding from the external surfaces of the base and adjacent to the annular groove. The bracket has an extending flange portion having various size U-shaped recesses for fixing the bracket in supporting relationship with the fluid line.

6 Claims, 2 Drawing Sheets

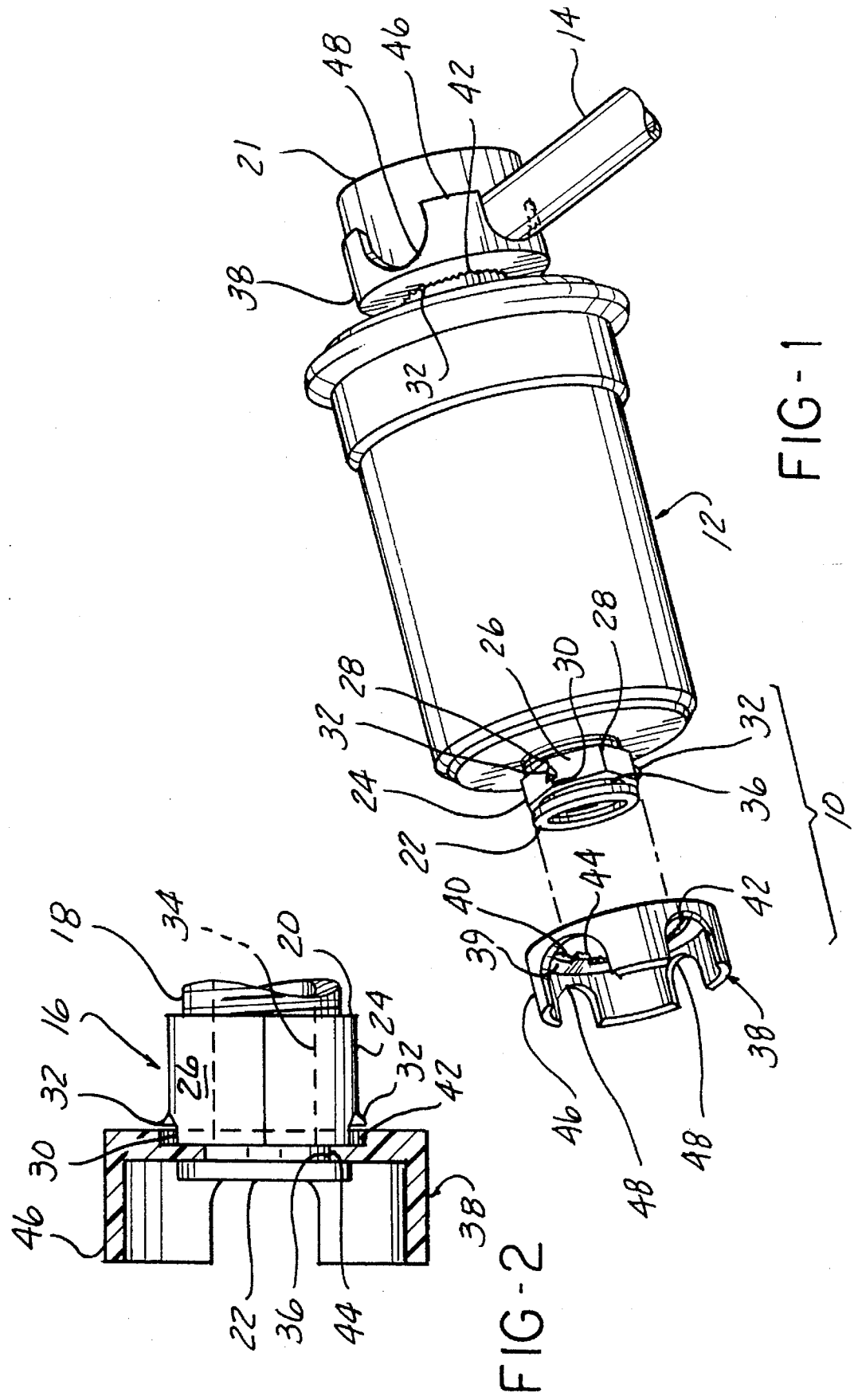

FUEL FILTER COUPLING BRACKET

FIELD OF THE INVENTION

The present invention relates to a coupling of the type used with high pressure fluid lines for connection to fluid filters.

BACKGROUND OF THE INVENTION

Current coupling brackets are finding increasing usage in automobiles having fuel injection systems which require high pressure in the fuel system. Generally, the coupling brackets will incorporate a fuel line support for incoming or outgoing fuel lines. Prior coupling brackets of this type have fuel line supports incorporated into the couplings which are fixed, during manufacture, in a position determined by the specific application in which the filter or other devices are to be installed. Fixed couplings of this type necessitate numerous replacement filter configurations, each having differently configured end fittings to match the fluid line configurations, which generally varies with each application.

The present invention is directed to a plastic universal fluid coupling bracket having fluid line supports which are adaptable to all supply line configurations in which may be fixed in position following adaptation, thus eliminating the need to manufacture and supply a differently configured fuel filter for each application.

SUMMARY OF THE INVENTION

It is an object of the present invention to provide a fluid coupling base member and a plastic fluid filter coupling bracket that has universal use and is adaptable to be secured on to both the inlet and outlet ends of the fluid filter, wherein the plastic fluid filter coupling bracket is snapped onto the base member and easily removable when the fluid filter needs to be replaced. The bracket is adjustable to accommodate fluid lines of varying configurations and sizes; and movably fixed in position once a desired configuration is determined.

The base member is tubular in shape to accommodate passage of fluid therethrough, and is formed with an annular groove and spaced, extending ledges disposed about its external perimeter. The crown-shaped bracket is configured to snapfit over the base member of the fluid filter. Once the bracket is mounted, it is fixed in position and will not rotate. The crown-shaped bracket forms a central aperture that is configured to pass over an end portion of the base member and has a tabbed portion received in the annular groove. A series of tabs are formed within the aperture so that the diameter of the central aperture is slightly smaller than the end portion of the base member. The tabs have a slight flexibility that allows them to pass over the end portion and be received within the annular groove in a non-rotatable relationship. A series of teeth, also located within the aperture and axially adjacent the tabs are supported by the extending ledges of the base member so that excessive pressure applied to the bracket will not dislodge a tab from the annular groove. A circular flanged end extends longitudinally from the central aperture of the bracket and is provided with various sized fluid line engaging recesses configured to support a fluid line about its external surface.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a perspective view showing a fluid filter with a base member and coupling bracket embodying the present invention installed on the inlet end of the fuel filters and a coupling bracket detached from the base member at the outlet end of the fluid filter;

FIG. 2 is a cross-sectional view of the coupling bracket in a fixed position with a base member of the fluid filter;

DESCRIPTION OF THE PREFERRED EMBODIMENT

Figure 3:
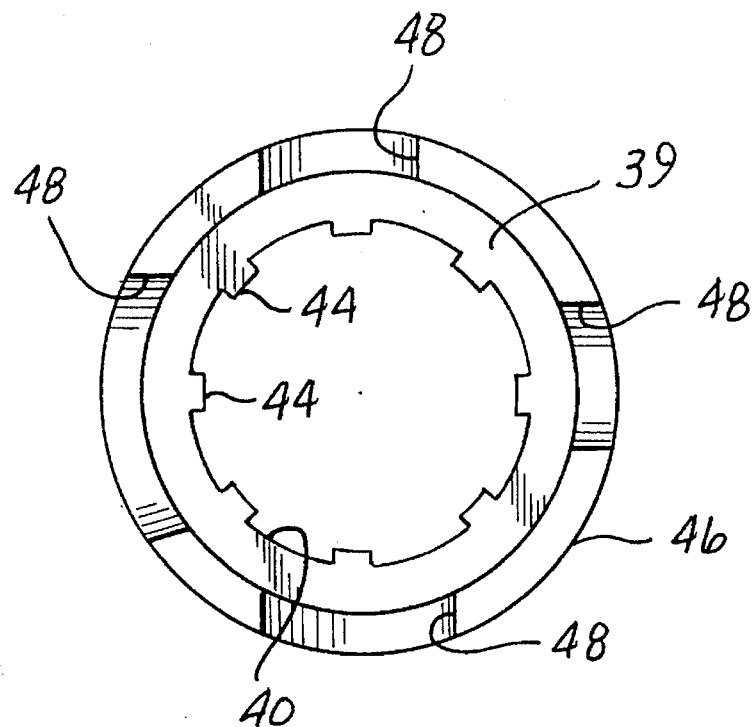
FIG. 3 is a top view of the coupling bracket.
Figure 4:
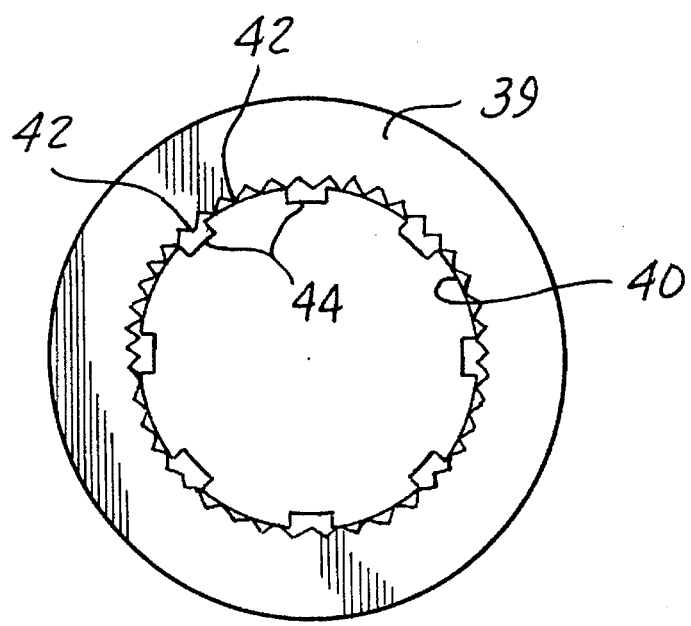
FIG. 4 is a bottom view of the coupling bracket.

In FIG. 1 there is shown a typical installation employing the fluid coupling 10 of the present invention. A conventional fluid filter 12 is provided with a fluid coupling, designated generally as 10, connected between the fluid line 14 and a filter 12. As seen in FIG. 2, a tubular fluid coupling base 16 has a first end portion 18 for engagement with the fluid filter 12. The first end portion 18 comprises a reduced diameter annular section for insertion into an aperture formed in the fluid filter 12. The annular end portion 18 extends longitudinally inwardly along the axis of the fluid coupling base to adjoin shoulder 20. Shoulder 20 has a larger external radius than does annular end portion 18 and acts as a stop to effectively limit entry of the fluid coupling base 16 into the fluid filter aperture.

The second annular end portion 22 of the fluid coupling base 16 engages a conventional fluid fitting 21 connected to the end of the fluid line 14. External contacting surfaces 24, disposed between the shoulder and second end portion 22, are provided for engagement with standard wrench-type tools. Such tools may be used when assembling the various portions of the fluid coupling 10. The external contacting surface 24 comprises a plurality of flat surfaces 26 that form a polygonal shape, wherein adjacent flat surfaces 26 share a meeting edge 28. At alternating meeting edges 28 proximate to the second end portion 22, a notched portion 30 is cut along the meeting edge 28 such that a radially extending ledge 32 is formed outwardly from the contacting surface 24 and having a flat surfaced notched portion 30 proximate to the second end portion 22. For a typical hexagonal-shaped external contacting surface 24, there will be three radially extending ledges 32 spaced along surface 24 proximate to second end portion 22. The radially extending ledges 32 increase the diameter of the external contacting surface 24 so that it is greater than an aperture 40 of the bracket 38. Disposed between the second end portion 22 of coupling base 16 and the notched portion 30 is an annular groove 36 around the external perimeter of base 16.

A crown-shaped pipe support bracket 38 is mountable within the groove 36 to prevent rotational movement about the annular groove 36 as well as axial movement along the longitudinal axis of the coupling base 16. A ring portion 39 of support bracket 38 sets on the coupling base 16, while an extending circular flange 46 of support bracket 38 extends axially away from the fluid filter 12. The internal radius of the ring portion 39 of bracket 38 has an aperture 40 having a diameter corresponding to the circumference of the annular groove 36 and smaller than second end portion 22. Located about the circumference of the aperture 40 are spaced tabs 44 that radially extend into the aperture 40 such that when installed upon the coupling base 16, tabs 44 are fixedly held within the annular groove 36. A series of continuous teeth 42 are also disposed around the circumference of aperture 40 and are axially adjacent to the tabs 44. Teeth 42 frictionally engage external contacting surface 24 at the notched portions 30, which is disposed between the annular groove 36 and the radially extending ledges 32 when the bracket 38 is fixed in position. The radially extending ledges 32 provides a support and a stop for the teeth 42 to limit axial movement of the bracket 38 on the base member 16. The extending ledges 32 also prevent the tabs 44 from being dislodged from the annular groove 36 and broken if too much pressure is applied when installing the bracket 38 onto base member 16. The combination placement of the teeth 42 and tabs 44 within the internal aperture 40 prevents rotational movement about the annular groove 36 of base member 16.

The fluid filter bracket 38 also includes the circular flanged end portion 46 which extends longitudinally outwardly from the ring portion 39 of the bracket 38. A plurality of U-shaped recesses 48 are formed in the flanged end portion 46 and configure to support the fluid line 14 which is attached to the second end portion 22 when the coupling 10 is in use. The U-shaped recesses 48 have different radiuses to accommodate the various manufacturer fluid line sizes. Therefore, one fluid filter bracket 38 is adaptable for use with most available fluid lines providing a universal bracket 38.

In use, the filter 12 is fitted with a base member 16 at its inlet and outlet and aligned in its desired application. The ring portion 39 of the bracket 38 is placed over each base member 16 and aligned so that desired size U-shaped recess 48 is placed in the direction of the fluid line 14. The bracket 38 is then manually snapped onto the base member 16 over second end portion 22 so that tabs 44 are located with annular groove 36 and teeth 42 are resting on extending ledges 32. Tabs 44 are flexible to yield so that second end portion 22 of base member 16 fits through aperture 40. With bracket 38 in place, the filter 12 can be sealingly engaged with the associated fluid lines 14. The coupling base 16 has a bore 34 extending longitudinally therethrough, for passage of fluid when the fluid line 14, fluid fitting 21, and coupling base 16 are sealingly engaged with fluid filter 12. When it is desirable to change the fluid filter, the fluid fitting 21 and fluid lines 14 are disconnected from the fluid coupling 10. The bracket 38 can be disengaged from the base member 16 on each end of the fluid filter 12 by manually pulling on the bracket 38 to dislodge the tabs 44 from annular groove 36. The bracket can be used again on a new clean fluid filter.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims which scope is to be accorded the broadest interpretation so as to encompass all such modifications and equivalent structures as is permitted under the law.

What is claimed is:

1. A fluid coupling device useful for coupling a fluid line to a fluid filter, said coupling comprising:

a tubular coupling base member, having a first end for engagement with a fluid filter, a second end for engagement with the fluid line, and an annular groove proximate to the second end; and a coupling bracket having a crown-shaped configuration having an inner and outer periphery, wherein said inner periphery defines a circular aperture therethrough, and comprising a plurality of tabs extending inwardly from the inner periphery for releasable engagement within the annular groove of the base member and a circular vertical flange extending axially around the outer periphery, said vertical flange having a U-shaped recess for engaging a fluid line.

2. The fluid coupling of claim 1, wherein said vertical flange has at least two U-shaped recesses having different radii for engaging a fluid line.

3. The fluid coupling of claim 1, wherein the base member has a first portion disposed between the annular groove and the first end and having a plurality of flat surfaces forming a polygonal shape about the circumference of the base member, wherein at a meeting edge of adjacent flat surfaces, said first portion has a notched portion forming a radially extending ledge.

4. The fluid coupling of claim 3, wherein the notched portion is adjacent the annular groove.

5. The fluid coupling of claim 4, wherein the inner periphery of the coupling bracket has a diameter less than the diameter of the first portion of the base member at the radially extending ledge.

6. The fluid coupling of claim 5, wherein the inner periphery includes a plurality of teeth engageable with the notched portion and secured in place in a non-rotational position by the radially extending ledge.

\* \* \* \* \*